Jan. 19, 1960 G. ZANARINI 2,922,120

SYNCHRONIZED SAW-TOOTH GENERATOR

Filed March 27, 1956 2 Sheets-Sheet 1

INVENTOR
GIUSEPPE ZANARINI
BY Young, Emery & Thompson
ATTYS.

SYNCHRONIZED SAW-TOOTH GENERATOR

Filed March 27, 1956 2 Sheets-Sheet 2

INVENTOR.
GIUSEPPE ZANARINI
BY
Young, Emery & Thompson
ATTYS.

1

2,922,120

SYNCHRONIZED SAW-TOOTH GENERATOR

Giuseppe Zanarini, Turin, Italy

Application March 27, 1956, Serial No. 574,167

Claims priority, application Italy April 8, 1955

4 Claims. (Cl. 331—151)

It is known that for the control of the horizontal scanning in the television receivers, it is necessary to generate locally a saw-tooth voltage, the frequency of which must follow exactly that of the synchronizing impulses emitted by the transmitting station and whose wave form will present a depicted steepness. Such generation is actually performed by circuits of various types but it has been ascertained that the circuit which guarantees the best frequency stability is the so called "sinusoidal oscillating circuit." It comprises substantially an electronic tube, oscillating in class C, whose oscillating frequency is determined by a tuned oscillating circuit, while a second tube driven by the first one, provides, by its discharge, the generation of oscillations having the required wave form, whose phase coincides with that of the nearly sinusoidal oscillations of the first oscillator; finally, a third tube which acts as an adjustable electronic reactance, is shunt connected to the oscillating circuit of the first tube, varying within certain limits its oscillating self frequency, in order to subject it to the synchronizing impulses, being in turn controlled by a phase localizing circuit.

The present invention has for an object an improved circuit of that kind, in which the function of generating the steepness of the saw-tooth voltage is devolved to the concurrent action of but two electronic tubes which comprise it, and which corresponds, in the conventional circuits, to the oscillating, respectively to the reactance tube. The circuit according to the invention obtains the same results as the standard sinusoidal oscillating circuit; it is substantially less expensive—one electronic tube and a series of circuit components being omitted—and presents moreover a considerable adjusting simplicity together with a great safety of working.

The following description is made with reference to the accompanying drawings, in which.

Figure 7:
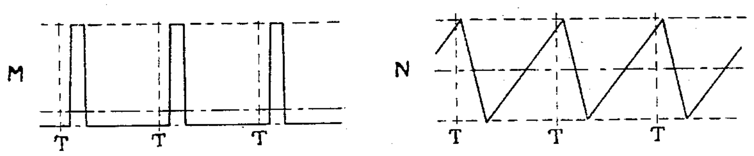

Fig. 7 indicates the wave's diagrammatic feature of the voltages being sent to the phase selecting circuit. The voltage scales are arbitrarily chosen both in the present as in the diagrams of Fig. 4.

The triode V2 is oscillating in class C and is controlled by the tuned circuit L1—C3, which, being highly efficient, is oscillating almost sinusoidally. The reactive coupling is obtained through the winding L2 which is tight coupled with L1 and in series with V2's anode circuit, while the terminal A of the tuned circuit is coupled to the triode's grid through R2 and C4.

The tube V1 (in the illustrated example is a pentode) is acting as electronic capacity, because the shunting circuit C1—R1 is applying a voltage, on its control grid

2 whose phase is anticipating by about 90° with reference to the anode voltage of the tube, and consequently with reference to the oscillation of the tuned circuit L1—C3. Condensers C2 and C8 whose capacities are rather high, have the task of bringing to earth the alternating components of the currents flowing to them. The equivalent capacity of tube V1 results therefore, for the corresponding alternating currents, shunt connected to the tuned circuit C3—L1 and modifies the proper oscillating frequency of same. On its side, the equivalent capacity of tube V1 is dependent upon the transconductance of said tube and consequently from the biasing potential of its control grid, which appears to be composed by a fixed fraction obtained through the positive polarization (referred to the control grid) of the cathode of VI by means of the voltage subdivider formed by the resistors R3—R6 to which a condenser C5 is shunt connected, bringing to ground the alternating current components; by a voltage droppage in R5 which depends upon the current in both tubes V1 and V2; finally by the control voltage applied through R1 to the control grid, coming from the phase localizing circuit which is not illustrated, as it may be of some known type. Moreover, the resistor R2 in series with the anode circuit of V1 is providing a reactive coupling between the latter and the tube V2.

The working of the circuit is as follows:

During all the time in which the tube V2 is blanked, the tube V1 will act as simple reactance tube, being controlled by the control voltage coming from the "phase localizing circuit" C—F, in the same manner as in conventional circuits. When the moment T is reached, in which the tube V2 is beginning to lead, the current flowing in it is increasing the voltage drop in R5 and consequently the voltage drop at the point F, reducing therewith the current in the tube V1 whose grid voltage is unvaried, while the voltage at the point B is rising up due to the smaller voltage drop occurring in R2. The voltage increase at B is transmitted through the condenser C4 to the point E (oscillating triode's grid) promoting a further increase of the current in V2. The process is then self-increasing with utmost rapidity until the current in V2 has reached its saturation degree—remaining thus practically constant during a certain period and decreasing thereafter normally until complete cancelling, at the next off-blanking of tube V2.

Figure 4:
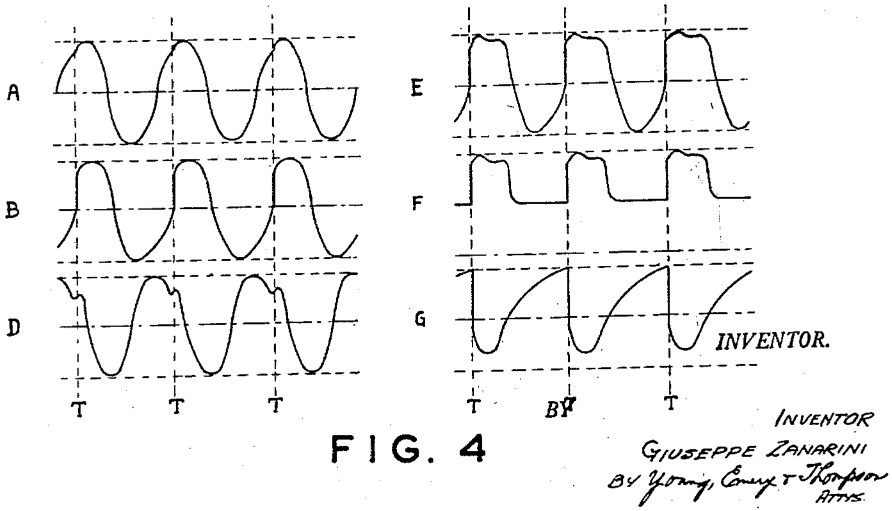
Fig. 4 is showing the diagrammatic outline of the wave form of the voltage in several points of the circuit.

The wave form of the voltages which are arising at various points of the circuit is diagramatically illustrated in Fig. 4, in which each diagram is referring to the point in the circuit whose reference letter is indicated close to the diagram itself. As it can be seen, the peculiar working of the circuit is also influencing the voltage state in A and D, but in a such smooth manner that the practically sinusoidal operation of oscillator is unaffected, whereas the gradual passing from the blanking to the saturation of the tube V2 which is peculiar to the working in class C, is replaced by a nearly instantaneous passage, which is similar to the characteristic one of the multivibrating circuits.

The saw-tooth voltage to be sent to the horizontal scan amplifier A.S.O. (not illustrated as it may be of whatsoever type) is obtained from the point G of the circuit, through the resistors and condenser group R7—R8—C6. In fact, during the blanking period of V2 the condenser is discharging itself gradually, so that at the outlet, through the condenser C7 which is provided to stop the direct current components, a tension will appear which will gradually increase until reaching the instant T. At the very moment in which the tube will suddenly pass, as we have seen, from blanking to saturation, the current which flows across R7 will suddenly bring down the voltage in G, and consequently the outlet voltage. The resistor R3 allows this rapid voltage drop, while condenser C6 is discharging again and again causing a further gradual voltage decrease which will however gradually increase anew, as soon as the tube V2 will attain its blanking conditions. The depicted steep retrace of the subcarrier which appears at the circuit outlet is well adapted for controlling with utmost precision the horizontal scan amplifier to which it is fed.

Figure 2:
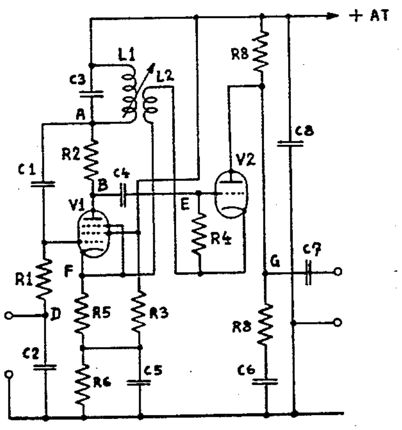
Figures 2 and 3 are variations of same circuit.
Figure 3:
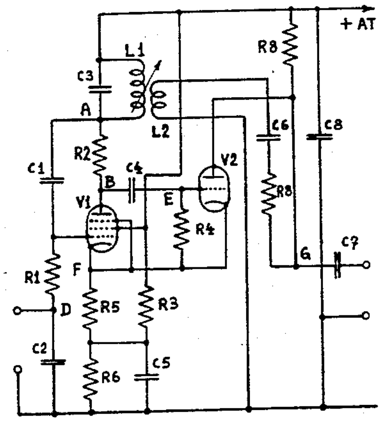

According to the variation of Fig. 2, the reactive coupling which allows the oscillation in class C of the tube V2, is obtained by inserting the reactive winding L2 in the cathode circuit of V2 instead of in its anode circuit, whereas according to Fig. 3, said winding is inserted between the condenser C6 and ground. That which remains of the circuits is unchanged and so is substantially their operation.

Some troubles can arise from above described circuits, in case the anode voltage between point +AT and ground should comprise disturbances due to the variable current absorption by the final video amplifying tube, when that absorption is not entirely compensated by the balancing capacities. In that case, according to the diagrams of Figures 1 to 3, said disturbances are arriving through condensers C3 and C1 to the control grid of tube V1 and are producing noises in its operation, that is to say, in the image reproduced in the kinescope.

Figure 5:
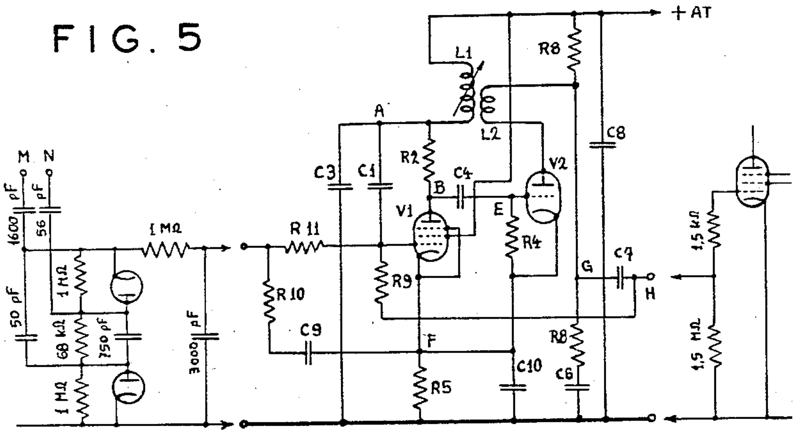
Fig. 5 is showing a circuit which is similar to that of Fig. 1 including three improvements.

According to the diagram of Fig. 5, that inconvenience is quite avoided by connecting the condenser C3, which represents together with the coil L1 the tuned circuit of the oscillator, between A and ground instead of between A and +AT. Regarding the tuned circuit, nothing is varied, because balancing condensers of very much higher capacity than that of C3 are inserted between +AT and ground; regarding the high frequency components of the previously mentioned disturbances that are precisely the only prejudicial ones, they can no more attain the control grid of V1, as the coil L1 and the condenser C3 constitute a low-pass filter which intercepts them. Regarding the adjustable inductance regulation of L1 for the settings of the circuit, it can easily be done through external control means, placing coils L1 and L2 close up to the control device itself, since the wiring of those coils is not critical at all and can be of considerable length without generating troubles.

Figure 1:
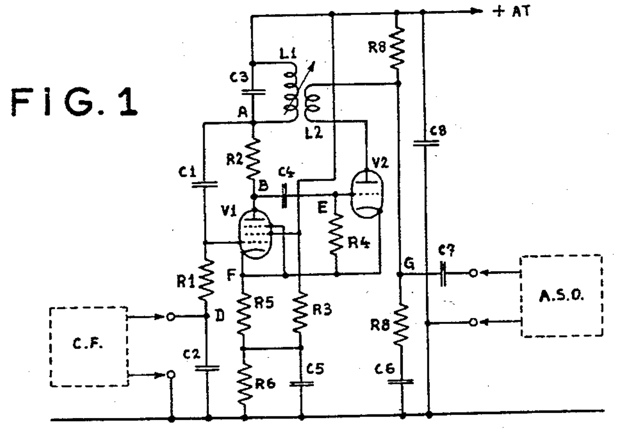
Fig. 1 shows an improved circuit according to the invention.

The voltage distributor R3—R6 according to the diagrams of Figures 1 to 3, which provides the fixed fraction of the cathodic bias voltage for the tube V1 must be fed by a rather intense current in order to be less sensitive towards the cathodic current variations of V1 and V2, which, flowing across R6, have a tendency to vary said biasing potential. High resistors costs, considerable electrical consumption, heating of parts, necessity of employing an expensive balancing condenser C5, are derived from the above arrangement.

According to the diagram of Fig. 5, the voltage distributor is totally omitted and therewith the fixed fraction of the cathode bias potential, since one of terminals of R5 is directly connected to ground.

The correct biasing of the control grid is obtained, instead, by producing a negative voltage of adapted value, directly applied to the control grid itself. For that scope, the control grid is connected through a high resistance resistor R9 to a point having a constant negative potential, which is located particularly, as shown in Fig. 1, after the condenser C7. That point H, as shown in Fig. 5 to the right, is connected through resistors to the control grid of the tube V3 which is the final horizontal scanning amplifier. Since said tube is working during a part of its cycle with grid current, a negative potential is applied at H, being constant even when the working conditions of the circuits of V1 and V2 are varying. Said negative potential is however too high for direct application to the control grid of V1 and a voltage distributor is then provided, giving to the resistor R9 an adapted value with reference to the measurable resistance between control grid of V1 and ground; as it can be seen in Fig. 5 on the left side, the control grid is connected to ground—through the phase localizing circuits which precede the synchronized generator—by means of a series of fixed resistors (two of which are alternatively shunted by diodes). In order to realize the unvarying negative voltage having the most adapted value in correspondence with the grid, it is then sufficient to suit the resistance of R9 to the grid-ground resistance.

It is important for the resistance of resistor R9 to be high, specially in order to prevent a reduction of efficiency of the phase detector (localizing) circuit.

Figure 6:
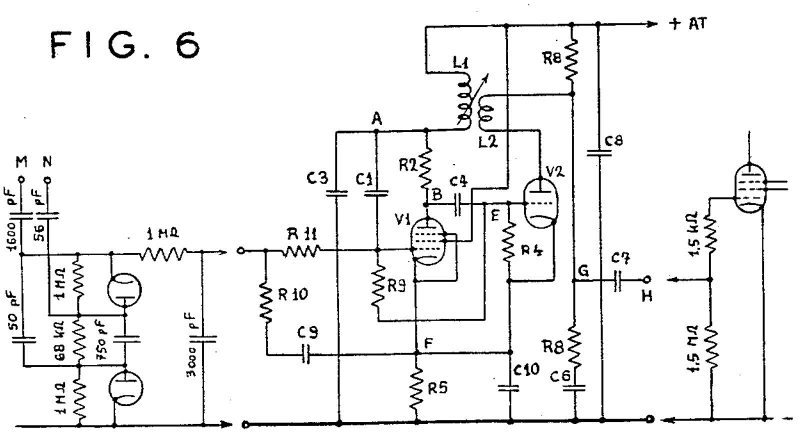
Fig. 6 is showing a variation of the diagram of Fig. 5.

According to the variation of Fig. 6, the negative bias potential is not taken after the condenser C7, but in correspondence with the point E (grid of tube V2). Since also the tube V2 is working during a portion of its cycle with grid current, a negative potential will appear here too, being then available for its scope; the solution is however not so complete as the previous one, because the negative tension is varying here a great deal, according to the working conditions of the circuit and the variations are not always profitable.

A further improvement intended to increase the working stability of the circuit consists in that the condenser C9 (replacing thus the C2 which is acting together with R10 as filter at the generator's inlet), is connected, instead of to ground, to the point F, while the condenser C10 is connecting the cathodes to ground, for the alternating currents, completing therewith the circuit. It has been ascertained that this connection—which moreover is already used in other known circuits—affords an improved working stability, preventing special disturbances from being amplified through the circuit. Condenser C10 is, further on, slackening the width of transition steepness of the descending wave generated by the impulses, which could perhaps attain excessive values, being therefore a source of troubles.

The detailed scheme and the calculation of the circuit elements can be determined according to the conventional methods of the electronic art and do not present any difficulty for the person skilled in the art who has been informed through the present description about the aims and the principles of the invention. As an indicative but by no means limitative example, some detailed data about circuits according to the invention are reported hereunder, which have proved experimentally to correspond to the proposed aims. They employ as electronic tubes the two sections of a double tube as the 6U8; the tuned circuit has a proper oscillating frequency; the anodic voltage 200 v.; the components of the circuits have the following values:

| | |
|---|---|
| C1=100 μμf. | R1=8.2 kΩ |
| C2=3,000 μμf. | R2=10 kΩ |
| C3=5,000 μμf. | R3=60 kΩ |
| C4=500 μμf. | R4=125 kΩ |
| C5=0.2 μf. | R5=270 Ω |
| C6=1,000 μμf. | R6=300 Ω |
| C7=3,000 μμf. | R7=6,800 Ω |
| C8=50 μf. | R8=2,200 Ω |
| C9=0.1 μf. | R9=20 MΩ |
| C10=15,000 μμf. | R10=27 kΩ |
| | R11=10 kΩ |

I claim:

1. A saw-tooth wave synchronized generator for automatic frequency control of the horizontal scanning in television receivers, including an electronic oscillator tube, a reactance tube, means to institute a cooperative action between said oscillator and reactance tubes, so that the oscillator tube is compelled to pass with extreme rapidity from non-conducting to saturation, said means comprising a resistor connected between the cathodes of both said tubes and ground, a capacitor connected between the anode of said reactance tube and the control grid of said oscillator tube, a resistor connected in series wtih the reactance tube anode, and a resistor connected between the control grid and the cathode of said oscillator tube, and additional means for generating a sawtooth wave in the output of said oscillator tube, said additional means comprising a resistor in the anode circuit of said oscillator tube, said resistor producing a rapid voltage drop during the passage of said oscillator tube from non-conducting to saturation, and a capacitor connected between a terminal of said latter resistor and ground, said capacitor producing a gradual voltage increase during the non-conducting period of said oscillator tube.

2. In a synchronized generator as set forth in claim 1, an inductance connected between a terminal of said resistor in series with the reactance tube anode and a source of positive potential, a capacitor connected between a terminal of said inductance and ground, thereby constituting a tunable resonant frequency circuit, and leveling condensers connected between said positive potential source and ground, said resonant circuit being closed for the alternating current through the leveling condensers.

3. In a synchronized generator as set forth in claim 1, an additional resistor connected between the control grid of said reactance tube and the control grid circuit of said oscillator tube whereby to supply a prefixed grid biasing voltage to the reactance tube.

4. In a synchronized generator as set forth in claim 1, a filter connected between the input of said reactance tube and the cathodes of both said reactance and oscillator tubes, and a capacitor connecting said cathodes to ground.

References Cited in the file of this patent

UNITED STATES PATENTS

| | | |
|---|---|---|
| 2,408,192 | Bell | Sept. 24, 1946 |
| 2,479,081 | Poch | Aug. 16, 1949 |
| 2,572,343 | Hugenholtz | Oct. 23, 1951 |